United States Patent Office 3,505,369
Patented Apr. 7, 1970

3,505,369
BIS(CYCLOPENTADIENYL) COMPOUNDS OF TITANIUM
John F. Deffner, Glenshaw, Pa., assignor to Gulf Research & Development Company, Pittsburgh, Pa., a corporation of Delaware
No Drawing. Filed Dec. 26, 1967, Ser. No. 693,146
Int. Cl. C07f 7/28
U.S. Cl. 260—429.5    11 Claims

ABSTRACT OF THE DISCLOSURE

Acetylacetonatobis(cyclopentadienyl)titanium nitrate and perchlorate and acetylacetonatobis ($C_1$–$C_4$ alkylcyclopentadienyl)titanium nitrates and perchlorates are disclosed as new compounds useful in modifying the polymerization of an olefin such as styrene. Examples show that polymerization of styrene is inhibited by acetylacetonatobis(cyclopentadienyl)titanium nitrate and perchlorate.

---

This invention relates to certain novel organometallic derivatives of cyclopentadiene which are useful in modifying olefin polymerizations, and more particularly to organotitanium derivatives of cyclopentadiene and alkyl-substituted cyclopentadienes.

The organotitanium derivatives of cyclopentadiene of this invention are represented by the following general formula

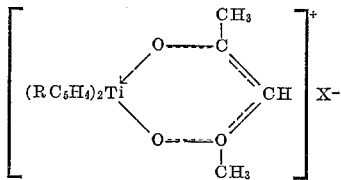

where R is a substituent selected from the group consisting of hydrogen and alkyl radicals having from 1 to 4 carbon atoms and X is an inorganic radical selected from the group consisting of nitrate ($NO_3$) and perchlorate ($ClO_4$) radicals. The R radicals on the two cyclopentadienyl rings in the above formula can be either the same or different radicals. Specific examples of compounds of the invention are acetylacetonatobis(cyclopentadienyl)titanium nitrate
acetylacetonatobis(cyclopentadienyl)titanium perchlorate
acetylacetonatobis(methylcyclopentadienyl)titanium nitrate
acetylacetonatobis(methylcyclopentadienyl)titanium perchlorate
acetylacetonatobis(ethylcyclopentadienyl)titanium nitrate
acetylacetonatobis(ethylcyclopentadienyl)titanium perchlorate
acetylacetonatobis(n-propylcyclopentadienyl)titanium nitrate
acetylacetonatobis(n-propylcyclopentadienyl)titanium perchlorate
acetylacetonatobis(isopropylcyclopentadienyl)titanium nitrate
acetylacetonatobis(isopropylcyclopentadienyl)titanium perchlorate
acetylacetonatobis(n-butylcyclopentadienyl)titanium nitrate
acetylacetonatobis(n-butylcyclopentadienyl)titanium perchlorate
acetylacetonatobis(sec-butylcyclopentadienyl)titanium nitrate
acetylacetonatobis(sec-butylcyclopentadienyl)titanium perchlorate
acetylacetonatobis(isobutylcyclopentadienyl)titanium nitrate
acetylacetonatobis(isobutylcyclopentadienyl)titanium perchlorate
acetylacetonatobis(t-butylcyclopentadienyl)titanium nitrate
acetylacetonatobis(t-butylcyclopentadienyl)titanium perchlorate The novel organotitanium derivatives of cyclopentadiene of this invention are stable solids under normal atmospheric conditions of temperature and pressure. The compounds decompose suddenly upon heating without evidencing a melting point. The nitrate derivatives are soluble in and unchanged by water. The perchlorates are insoluble in water. The unsubstituted organotitanium derivatives of cyclopentadiene are insoluble in most hydrocarbons. Some of the alkyl-substituted cyclopentadiene derivatives have a limited solubility in aromatic hydrocarbons.

The compounds of the invention can be variously prepared. The compounds, for example, can be prepared at room temperature in a sequence of steps which comprise reacting the dichlorides of titanium bis(cyclopentadienyl) and alkyl-substituted derivatives thereof with silver nitrate and silver perchlorate in the presence of a solvent such as water, acetone, ethanol and mixtures thereof to form the corresponding nitrates and perchlorates of titanium bis(cyclopentadienyl) and titanium bis($C_1$–$C_4$ alkylcyclopentadienyls). The silver chloride which precipitates from the reaction mass can be removed at this point or it can be left in admixture with the nitrates and perchlorates which are in solution. The nitrates and perchlorates of titanium bis(cyclopentadienyl) or titanium bis($C_1$–$C_4$ alkylcyclopentadienyls) are then reacted with sodium acetylacetonate or with acetylacetone to form the corresponding acetylacetonatobis(cyclopentadienyl) titanium nitrates and perchlorates and acetylacetonatobis (alkylcyclopentadienyl)titanium nitrates and perchlorates. The nitrates and perchlorates thus obtained can be recovered and purified according to known techniques including solvent extraction, filtration, recrystallization, or the like, dependent upon the nature of the particular compound in question. In recovering and purifying the products, care is required to avoid heating at an elevated temperature inasmuch as the products decompose suddenly without evidencing a melting point. The preparation of the organotitanium derivatives of cyclopentadiene of this invention can be illustrated by the following equations:

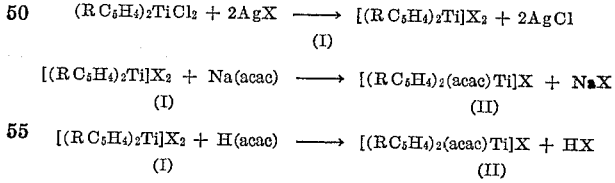

where acac is an acetylacetonate group and R and X are as indicated hereinabove.

The reaction is carried out in the presence of an inert solvent at a temperature within the range of about 0° to 100° C., generally between 0° and 75° C. and most advantageously at room temperature.

In preparing the organotitanium derivatives of cyclopentadiene of the present invention according to the reactions shown in the above equations, the initial reactants comprising bis(cyclopentadienyl)titanium dichloride and the bis($C_1$–$C_4$ alkylcyclopentadienyl)titanium dichlorides are available commercially so that neither of these reactants nor their method of preparation constitutes any portion of the invention. If desired, however, the bis(cyclopentadienyl)titanium dichlorides can be prepared by reacting cyclopentadienylmagnesium chloride with the corresponding titanium tetrachlorides according to a process which is disclosed in U.S. Patent No. 2,983,740 which issued on May 9, 1961, John C. Thomas et al. As disclosed in the latter patent, butylmagnesium chloride is first prepared by reacting n-butyl chloride with magnesium turnings in the presence of anhydrous benzene and anhydrous ether. The butylmagnesium chloride is then reacted with cyclopentadiene in an anhydrous benzene solution thereof. The cyclopentadienylmagnesium chloride which is obtained is then reacted with titanium tetrachloride in an anhydrous benzene solution thereof. Subsequent treatment of the product thus obtained can result in two different dicyclopentadienyltitanium chlorides represented empirically by the formulae $[(C_5H_5)_2TiCl]_2O$ and $(C_5H_5)_2TiCl_2$. It is a compound having the latter formula which is used in preparing the acetylacetonatobis(cyclopentadienyl)titanium compounds of the present invention.

The following examples, in which all parts are by weight unless otherwise stated, illustrate specific procedures by which compounds of the invention can be prepared.

EXAMPLE I

Acetylacetonatobis(cyclopentadienyl)titanium nitrate

Bis(cyclopentadienyl)titanium dichloride (63 parts) is mixed with 50 parts by volume of acetone and 500 parts of water. The mixture thus formed is stirred at room temperature while adding a solution consisting of 85 parts of silver nitrate dissolved in 250 parts of water. Almost immediately the bis(cyclopentadienyl)titanium dichloride is dissolved and silver chloride is precipitated. An aqueous solution consisting of 34 parts of sodium acetylacetonate monohydrate in 250 parts of water is then added to the reaction mass at room temperature. At this point, the color of the mixture changes from orange to deep purple. The mixture is then filtered and the filtrate is extracted with an extractant mixture consisting of 1 part by volume of acetylacetone and 2 parts by volume of chloroform. The extraction is continued until the extract is nearly colorless. The combined extracts are concentrated by mild heating under a reduced pressure. The residue is diluted with benzene and filtered. The filter cake is washed with benzene and dried. The product, 10.5 parts of acetylacetonatobis(cyclopentadienyl)titanium nitrate, is a deep purple, crystalline solid which decomposes suddenly, without melting, at 166° C. A carbon, hydrogen and nitrogen determination of the product thus obtained shows a favorable comparison to the theoretical analysis for acetylacetonatobis(cyclopentadienyl)titanium nitrate as follows:

| Ultimate analysis | Found for product | Calculated for acetylacetonatobis(cyclopentadienyl)titanium nitrate ($C_{15}H_{17}NO_5Ti$) |
|---|---|---|
| Carbon | 53.11 | 53.11 |
| Hydrogen | 5.10 | 5.05 |
| Nitrogen | 4.02 | 4.13 |

The infrared spectrum of the product using a Perkin-Elmer Model 137 Spectrophotometer has bands at 3120, 1550, 1540, 1525, 1420, 1360, 1335, 1285, 1030, 1025, 1015, 950, 935, 850, 835, 797 and 675 cm.$^{-1}$ (in Nujol and Fluorolube).

EXAMPLE II

Acetylacetonatobis(cyclopentadienyl)titanium perchlorate

Bis(cyclopentadienyl)titanium dichloride (25 parts) is mixed with 20 parts by volume of ethanol and 300 parts of water. The mixture thus formed is stirred at room temperature while adding a solution consisting of 41.4 parts of silver perchlorate dissolved in 500 parts of water. The bis(cyclopentadienyl)titanium dichloride goes into solution and silver chloride is precipitated. The mixture is filtered. Acetylacetone (24 parts by volume) and ethanol (20 parts by volume) are added to the filtrate. A dark precipitate is formed almost immediately. The mixture is stirred at room temperature for one hour. The precipitate is removed by filtration, washed with water and acetone and dried. The yield is 18.9 parts of crude product. A portion of the crude product is extracted with acetone at room temperature. The extract is concentrated under reduced pressure, without heating. A deep red, crystalline solid is precipitated. The recrystallized product is recovered by filtration and dried. The product decomposes explosively, without melting at 284° C. The infrared spectrum indicates that the product is acetylacetonatobis(cyclopentadienyl)titanium perchlorate. The infrared spectrum of the product using a Perkin-Elmer Model 137 Spectrophotometer has bands at 3120, 1545, 1540, 1520, 1430, 1355, 1320, 1285, 1100, 1030, 950, 935, 870, 835, 807 and 770 cm.$^{-1}$ (in Nujol and Florolube).

The compounds of this invention are valuable in modifying reactions involving the polymerization of olefins. I have found, for example, that acetylacetonatobis(cyclopentadienyl)titanium nitrate and acetylacetonatobis(cyclopentadienyl)titanium perchlorate are useful in inhibiting the polymerization of styrene.

In order to illustrate the effect which compounds of the invention have in modifying the polymerization of an olefin, comparative polymerization tests have been made with styrene and styrene containing a compound of the invention. In these tests, 10 cc. of freshly distilled styrene and 10 cc. of freshly distilled styrene containing 0.025 gram of a compound to be tested are separately heated at 60° C. until the styrene is polymerized to an extent that it is too viscous to flow. The time required to reach a "no flow" condition is taken as a measure of the polymerization modifying characteristics of the compound. The results of the polymerization tests are set forth in the following table:

| Compound tested: | Heating time in hours required for styrene to reach a "no flow" condition |
|---|---|
| None (Control Test) | 89 |
| Acetylacetonatobis(cyclopentadienyl)titanium nitrate | 114 |
| Acetylacetonatobis(cyclopentadienyl)titanium perchlorate | 258 |

The data set forth in the above table clearly indicate that the titanium compounds inhibit polymerization of styrene.

While the organotitanium derivatives of cyclopentadiene have been described with particular reference to their ability to modify the degree to which olefins are polymerized, the compounds of the invention may also serve as components for rocket fuels, oxidation catalysts, hydrogenation catalysts, nitrogen reducing catalysts, cetane improvers, antistatic agents, paint dryers, resin curing agents and combustion improvers for fuels.

While my invention has been described with reference to various specific examples and embodiments, it will be understood that the invention may be variously practiced within the scope of the claims hereinafter made.

I claim:
1. An organotitanium derivative of cyclopentadiene represented by the general formula

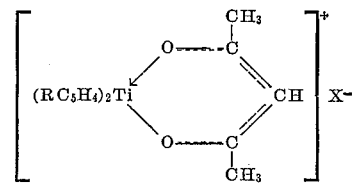

where R is a substituent selected from the group consisting of hydrogen and alkyl radicals having from 1 to 4 carbon atoms and X is an inorganic radical selected from the group consisting of nitrate ($NO_3$) and perchlorate ($ClO_4$) radicals.

2. Acetylacetonatobis (cyclopentadienyl) titanium nitrate.
3. Acetylacetonatobis (cyclopentadienyl) titanium perchlorate.
4. Acetylacetonatobis (methylcyclopentadienyl) titanium nitrate.
5. Acetylacetonatobis (methylcyclopentadienyl) titanium perchlorate.
6. Acetylacetonatobis (ethylcyclopentadienyl) titanium nitrate.
7. Acetylacetonatobis (ethylcyclopentadienyl) titanium perchlorate.
8. Acetylacetonatobis (propylcyclopentadienyl) titanium nitrate.
9. Acetylacetonatobis (propylcyclopentadienyl) titanium perchlorate.
10. Acetylacetonatobis (butylcyclopentadienyl) titanium nitrate.
11. Acetylacetonatobis (butylcyclopentadienyl) titanium perchlorate.

References Cited

FOREIGN PATENTS 858,930   1/1961   Great Britain.

OTHER REFERENCES

Reynolds, J.: Inorg. & Nucl. Chem. (1964), pp. 667–668.

Pande et al.: Chemistry and Industry, September 1958, p. 1198.

Moeller: Inorganic Synthesis, vol. II, p. 119 (1946).

Feld & Cowe: Organic Chem. of Titanium, Butterworths, Washington, D.C., p. 5, 1965.

TOBIAS E. LEVOW, Primary Examiner

H. M. S. SNEED, Assistant Examiner

U.S. Cl. X.R.

44—68; 106—310; 149—23, 109; 252—431; 260—93.5